Sept. 23, 1958  M. C. JOHNSON ET AL  2,853,702
MOVING TARGET CANCELLATION CIRCUIT
Filed Nov. 8, 1956
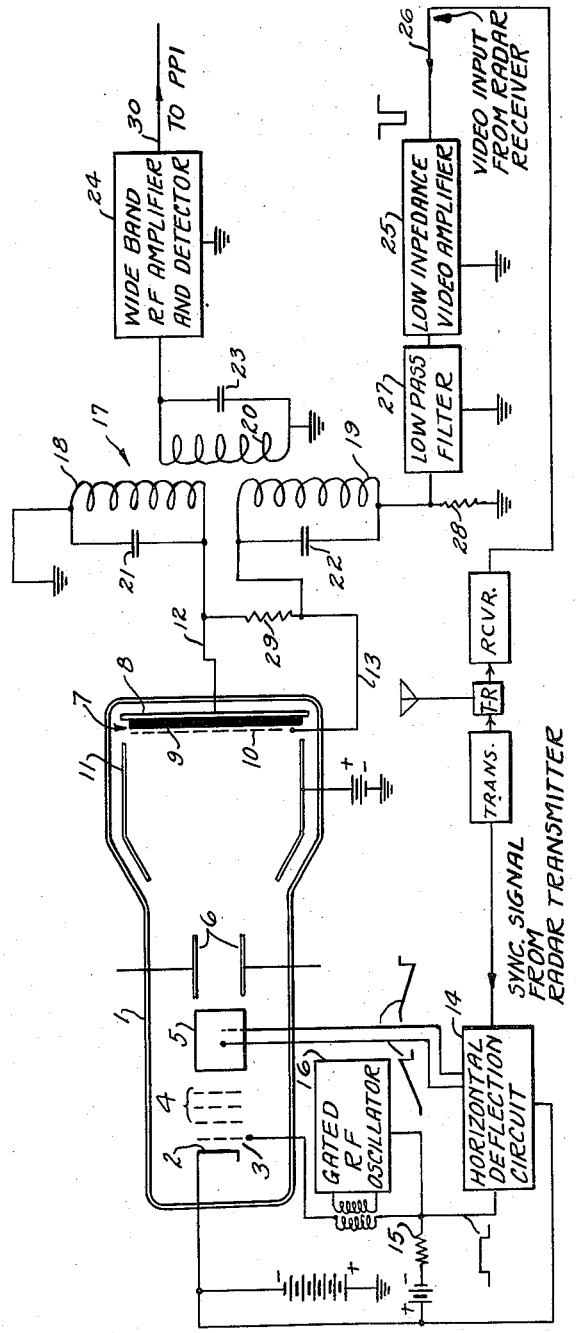
INVENTORS.
ROBERT F. AHRENS
MILES C. JOHNSON
BY
ATTORNEY
AGENT

United States Patent Office 2,853,702
Patented Sept. 23, 1958

2,853,702

MOVING TARGET CANCELLATION CIRCUIT

Miles C. Johnson, Mount Holly, and Robert F. Ahrens, Eatontown, N. J., assignors to the United States of America as represented by the Secretary of the Air Force Application November 8, 1956, Serial No. 621,189

7 Claims. (Cl. 343—7.7)

This invention relates to cathode-ray tube storage circuits employing storage tubes of the backplate-modulation type, an example of which is the RCA C73405 Radechon.

It is the purpose of the invention to provide a storage circuit incorporating a storage tube of the above type in which simultaneous reading and writing of wideband (5 mc.) pulsed information is possible. Such circuits are useful where a comparison of successive signals is required a specific example being the cancellation circuit of a high resolution MTI (moving target indication) radar system.

In storage tubes of the backplate-modulation type the input or writing signal is applied between the backplate and the element serving as the equilibrium potential reference. This element may be the collector electrode but, since tubes of this type usually employ a barrier grid, it is most likely the barrier grid. Since all of the secondary electrons escaping from the dielectric surface may not reach the collector electrode, the backplate current is preferably taken as the output. Both the input and output circuits must be coupled to the same electrodes and since the magnitude of the input signal is many times that of the output signal isolation of these circuits is required for simultaneous reading and writing. In accordance with the invention, this is accomplished by modulating the beam of the cathode-ray tube at a high radio frequency and using a transformer having two primary windings and one secondary winding, all tuned to the modulating radio frequency, for coupling the backplate to the output circuit and the input circuit to the barrier grid and backplate. The input circuit is connected to the backplate and barrier grid through the primary windings in series. Isolation of the input and output circuits is effected by so poling the primary windings that the voltages induced in the secondary by the input currents cancel. The output signal is derived from the R. F. voltages in the secondary by amplification and rectification.

A more detailed description of the invention will be given in connection with the specific embodiment thereof shown in the accompanying drawing.

The storage circuit is shown in the drawing as it would be used in the cancellation circuit of an MTI (moving target indicator) radar receiver. In this application it is desired to obtain an output signal whenever the magnitude of a received echo differs from the magnitude of the preceding echo from the same target. The circuit comprises a storage tube of the barrier grid backplate-modulation type having an evacuated envelope 1 in which are located a cathode 2, a beam intensity control electrode 3, schematically indicated beam forming electrodes 4, horizontal deflection plates 5 and vertical deflection plates 6. At the opposite end of the tube from the cathode is a target electrode generally designated 7 comprising a conductive backplate 8, a layer 9 of good insulating material such as mica, and a barrier grid 10. The thickness of the dielectric sheet 9 and the spacing of barrier grid 10 therefrom are exaggerated in the drawing for clarity, both the thickness and spacing actually being of the order of a thousandth of an inch or so. A collector electrode 11 is situated adjacent the barrier grid.

The operation of barrier grid backplate modulation storage tubes is described in the literature, for example, Storage Tubes and Their Basic Principles by Knoll and Kazan, John Wiley & Sons, Inc., New York, 1952. Briefly, the tube stores information in the form of a charge pattern on the dielectric sheet 9. The process requires that the energy in the electron beam which passes through grid 10 and strikes the surface of dielectric sheet 9 be sufficient for a secondary electron emission ratio greater than unity. The disposition of the secondary electrons depends upon the potential relative to grid 10 of the elemental area of the dielectric sheet upon which the beam is impinging. If the potential of this area is initially higher than that of the grid secondary electrons return to the area lowering its potential. One function of the barrier grid is to insure that the secondary electrons return to the area from which they were emitted and do not travel to and alter the charge at other areas of the dielectric surface. Eventually a lower potential will be reached at which some of the secondary electrons have sufficient energy to reach or penetrate the grid. Those passing through the grid travel to the collector electrode 11 which is at a higher potential than the grid. As the potential of the elemental area continues to fall the rate at which secondary electrons flow to grid 10 or penetrate this grid and continue to the collector electrode increases until eventually it exactly equals the rate at which primary electrons reach the elemental area. No further change in the potential of the elemental area then takes place and the potential, slightly above that of the grid, at which this state of equilibrium is reached is called the equilibrium potential.

If the potential of the elemental area is initially lower than that of grid 10 the rate at which secondary electrons escape to and through the barrier grid is initially higher than the rate at which primary electrons impinge on the dielectric, and the potential of the elemental area therefore rises. As the potential rises the rate of escape decreases until the above described state of equilibrium is reached and the elemental area is at the equilibrium potential.

As seen above the effect of the electron beam when it impinges on any elemental area is to cause negative charge to be added to or removed from the area by a sufficient amount to bring the area to the equilibrium potential. The potential of the elemental area just prior to bombardment by the beam is determined by the charge already on the area and the potential of plate 8. Therefore these two factors determine the negative charge that must be added or subtracted to bring the elemental area to equilibrium potential. If the electron beam of the tube is caused to scan over a given path on the target surface and at the same time the potential between plate 8 and grid 10 is varied in accordance with a given signal a pattern of charge is established along the scan path on the dielectric that corresponds to the signal. If the beam is again caused to scan over the same path and exactly the same signal voltage is applied between the backplate and grid, each elemental area will be at its equilibrium potential when the beam impinges on it and its potential relative to plate 8 will not change. Therefore there will be no alteration of the charge pattern on the dielectric. If, however, the signal is not the same as during the first scan, one or more of the elemental areas will be at a potential different from the equilibrium value at the time it receives the electron beam due to the different instantaneous potential of plate 8, and in reestablishing the equilibrium potential an adjustment of the charge associated with this area will take place. The rate of change of this charge gives rise to a flow of output current to or from backplate 8 along conductor 12, which current is a direct measure of the difference between the second signal and the first signal.

Considering in more detail the operation of the storage tube circuit in the cancellation circuit of an MTI receiver, a synchronizing pulse that is coincident with each pulse transmitted by the radar receiver is supplied by the radar transmitter and applied to horizontal deflection circuit 14. It will be assumed for simplicity that the scan path of the electron beam across the face of the target 7 is a single horizontal line. In this case a fixed potential is applied to vertical deflection plates 6 and a linear sawtooth voltage to horizontal deflection plates 5. One horizontal scan is initiated at each transmitted pulse by circuit 14. Circuit 14 also supplies a gating and unblanking voltage across resistor 15 and to radio frequency oscillator 16 which turns the beam and oscillator on at the beginning of each sweep and off at the end. It is preferable that the oscillator start each time at the same phase.

Since the electron beam of the storage tube is modulated at the frequency of oscillator 16 the target output currents in conductors 12 and 13 are also modulated at this frequency. Transformer 17, having primary windings 18 and 19 and secondary winding 20 tuned by condensers 21, 22 and 23 to the frequency of oscillator 16, functions to couple the target output to the input of radio frequency amplifier and detector 24. The current in conductor 12 due to a change in the charge pattern of the target flows in the primary winding 18. This current which as already mentioned is modulated by the radio frequency of oscillator 16, induces a proportionate voltage of the same frequency in secondary 20.

The video signal from the radar receiver arrives at the input of video amplifier 25 over conductor 26. After passage through low-pass filter 27 the video signal appears across resistor 28. The frequency of oscillator 16 and therefore the resonant frequency of circuits 18—21 and 19—22 is high compared to the highest video frequency component. Therefore, windings 19 and 18 offer little series reactance to the video currents and substantially the full video signal appears across resistor 29, or between backplate 8 and grid 10.

The primary windings of transformer 17 are equally coupled to the secondary winding and are so poled that the video currents flowing through these windings induce voltages in the secondary that exactly cancel. The input to amplifier 24 is therefore isolated from the video signal and receives only the signal resulting from an alteration of the charge pattern on the target of the storage tube. After amplification and detection in element 24, the output signal, free of radio frequency components, appears on conductor 30.

In order to change the potential of the storage surface with respect to the barrier grid the source of video signal (amplifier 25 and filter 27) must be capable of charging the backplate to barrier grid capacitance, which is of the order of 1000 mmf., with the rapidity required for a wide video band. A video source having an internal impedance of the order of 50 ohms is required for a video rise time of approximately 0.1 microsecond.

Since in MTI (moving target indicator) radar successive echoes from a moving target vary in amplitude at a Doppler frequency these echoes will not be identical in successive scans of the storage tube and an output signal will appear on conductor 30. This output signal may be applied to a suitable display device such as PPI (plan position indicator). Targets having no velocity relative to the radar equipment will show no change in successive returns and consequently no output corresponding to these targets will appear on conductor 30. The storage circuit therefore serves to cancel the fixed target return from the video signal leaving only that part of the video signal representative of targets having radial motion relative to the radar equipment.

We claim:
1. In combination with a cathode-ray storage tube of the type having as the storage element a dielectric sheet situated between a conductive backplate and a barrier grid, means modulating the beam of said cathode-ray tube in accordance with an alternating voltage, an input circuit, an output circuit, a transformer having two primary windings equally coupled to a secondary winding, means connecting one side of said input circuit through one of said primary windings to said barrier grid, means coupling the other side of said input circuit through the other primary winding to said backplate, said primary windings being poled so that the voltages induced in said secondary by the input circuit currents cancel, and means coupling said output circuit to said secondary winding.

2. In combination with a cathode-ray storage tube of the type having as the storage element a dielectric sheet situated between a conductive backplate and a barrier grid, means for modulating the beam of said cathode-ray tube at a high frequency, an input circuit, an output circuit, a transformer having two primary windings equally coupled to a secondary winding, means tuning said primary and secondary windings to said high frequency, means connecting one side of said input circuit through one of said primary windings to said barrier grid, means coupling the other side of said input circuit through the other primary winding to said backplate, said primary windings being poled so that the voltages induced in said secondary by the input circuit currents cancel, and means coupling said output circuit to said secondary winding.

3. A signal comparison circuit comprising: a cathode-ray storage tube having a storage element in the form of a dielectric sheet situated between a conductive backplate and a barrier grid, a cathode, beam forming means for directing a beam of electrons derived from said cathode through said grid to said dielectric sheet, a collector electrode situated adjacent said grid, and beam deflecting electrodes for sweeping said beam over a predetermined path on the surface of said dielectric sheet; means for modulating said beam in accordance with a periodic wave; a transformer having two primary windings equally coupled to a secondary winding; an input circuit in which the signals to be compared appear in succession; means providing a point of reference potential; direct current connections between said cathode and said point of reference potential and between said collector electrode and said point of reference potential; a direct current connection from said backplate through one of said primary windings to said point of reference potential; a direct current connection from said barrier grid to one end of the other primary winding; means connecting said input circuit between the other end of said other primary winding and said point of reference potential; said primary windings being poled so that the voltages induced in said secondary winding by input signal currents cancel; means connected to said deflecting electrodes for sweeping said beam over said predetermined path during the occurrence of each signal in the input circuit; and an output circuit coupled to said secondary winding.

4. Apparatus as claimed in claim 3 in which the frequency of said modulating wave is high relative to the input signal frequency and in which means are provided for tuning said primary and secondary winding to said modulating wave frequency.

5. In a moving target indicator radar system having a transmitter periodically radiating a pulse of electromagnetic energy and a receiver for receiving reflections of said energy and converting said reflections into a corresponding video signal, a cancellation circuit for comparing the video signal following each radiated pulse with the video signal following the preceding radiated pulse and for producing an output signal when said successive video signals differ in amplitude, comprising: a cathode-ray storage tube having a storage element in the form of a dielectric sheet situated between a conductive backplate and a barrier grid, a cathode, beam forming means for directing a beam of electrons derived from said cathode through said grid to said dielectric sheet, a collector electrode situated adjacent said grid, and beam deflecting electrodes; means for modulating said beam in accordance with a periodic wave; a transformer having two primary windings equally coupled to a secondary winding; an input circuit leading from the output of said receiver for applying said video signal to said cancellation circuit; means providing a point of reference potential; direct current connections between said cathode and said point of reference potential and between said collector electrode and said point of reference potential; a direct current connection from said backplate through one of said primary windings to said point of reference potential; a direct current connection from said barrier grid to one end of the other primary winding; means connecting said input circuit between the other end of said other primary winding and said point of reference potential; said primary winding being poled so that the voltages induced in said secondary winding by video signal currents cancel; means connected to said deflecting electrodes and synchronized with the pulses radiated by said transmitter for initiating a sweep of said beam over a predetermined path on said dielectric sheet each time a pulse is radiated; and means coupled to said secondary winding to amplify and rectify the voltage across said secondary to produce an output signal.

6. Apparatus as claimed in claim 5 in which the frequency of said modulating wave is high relative to the input signal frequency and in which means are provided for tuning said primary and secondary winding to said modulating wave frequency.

7. Apparatus as claimed in claim 5 in which said input circuit has a low impedance.

No references cited.